Dec. 2, 1958   J. J. CÓRDOVA   2,862,520
COMPOUND VALVE FOR MIXING, DISTRIBUTING, AND
VOLUME CONTROL OF FLUID
Filed June 20, 1955   2 Sheets-Sheet 1
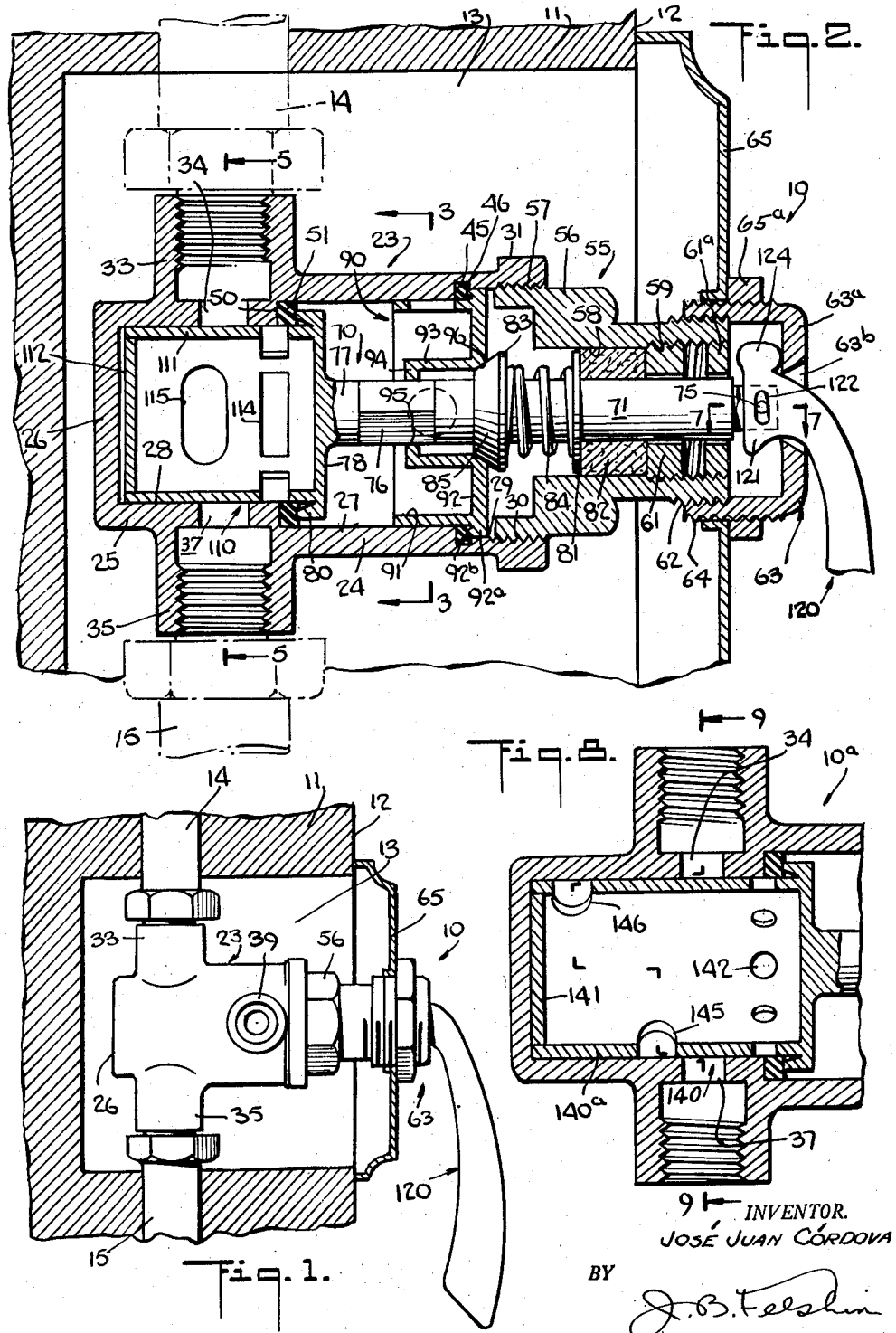
INVENTOR.
JOSÉ JUAN CÓRDOVA
BY
J. B. Felshin
ATTORNEY

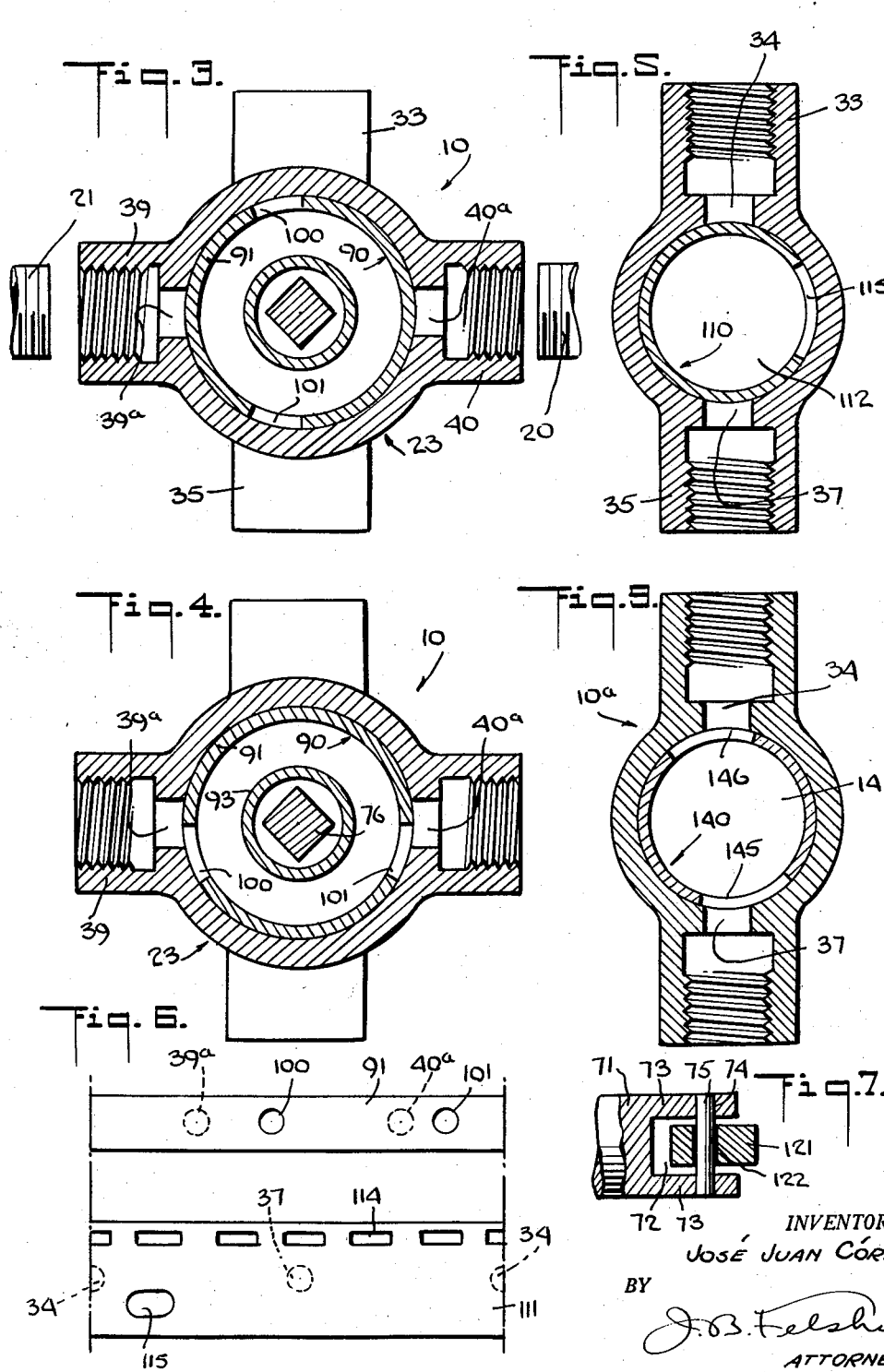

2,862,520

COMPOUND VALVE FOR MIXING, DISTRIBUTING, AND VOLUME CONTROL OF FLUID

José Juan Córdova, Buenos Aires, Argentina

Application June 20, 1955, Serial No. 516,455

4 Claims. (Cl. 137—636.2)

This invention relates to a compound valve for mixing, distributing, and volume control of fluid. My invention may be embodied in a bathroom valve to control the mixing, distributing and volume of both hot and cold water to the shower and bathtub faucets.

One object of this invention is to provide a device of the character described which may be controlled by a single handle movable about two axes at right angles to one another, for selectively passing cold water only to the shower, hot water only to the shower, cold water only to the bathtub faucet, hot water only to the bathtub faucet, mixed hot and cold water in various proportions to the shower, hot and cold water mixed in various proportions to the bathtub faucet, and also for controlling the volume of water passed to the shower, or bathtub faucet for each of the selected conditions. The valve embodying the invention also includes means for shutting off the flow of water entirely to the shower or bathtub faucet.

It will be understood that the invention, while illustrated in the drawing as a bathroom valve, may be embodied in devices for mixing, distributing and volume control of water, gas, steam or other fluids.

Still another object of this invention is to provide a strong, rugged and durable device of the character described shall be easy to manipulate, relatively inexpensive to manufacture, and yet which shall be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention:

Fig. 1 is a side elevational view of a valve embodying the invention;

Fig. 2 is an axial cross-sectional view of the structure shown in Fig. 1;

Fig. 3 is a cross-sectional view taken on line 3—3 of Fig. 2 and showing the inner valve sleeve controlling the hot and cold water in position for shutting off all flow of water;

Fig. 4 is a view similar to Fig. 3 but showing the inner valve sleeve controlling the inlet of hot and cold water in a position for mixing hot and cold passing to the shower;

Fig. 5 is a cross-sectional view taken on line 5—5 of Fig. 2;

Fig. 6 is a developed view of the rotary inner valve sleeve for controlling inlet of hot and water, and the sliding and rotary inner valve sleeve controlling the outlet of water to the shower and bathtub faucet and for controlling the volume of water passed to the shower and bathtub faucet illustrating their relationship to the hot and cold inlet openings and the shower and bathtub faucet outlet opening;

Fig. 7 is a cross-sectional view taken on line 7—7 of Fig. 2;

Fig. 8 is a partial view similar to Fig. 2 and illustrating a modified construction; and Fig. 9 is a cross-sectional view taken on line 9—9 of Fig. 8.

Referring now in detail to the drawing, 10 designates a compound valve for mixing, distributing and volume control of fluids and embodying the invention. The same may be mounted on a wall 11, for example, the wall of a bathroom, said wall having a front surface 12 and being formed with a hollow chamber or socket 13 opening to said front surface of said wall. Within the wall, is a vertical pipe 14 leading up to the shower head and projecting down to the chamber 13 from the top thereof. Also, within said wall is a pipe 15 extending downwardly to the bathtub faucet and projecting upwardly into the chamber 13 through the bottom thereof, also extending within the wall 11 are cold and hot pipes 20 and 21, respectively, projecting into the chamber 13 inwardly from two sides thereof, said pipes being located closer to the front surface 12 of wall 11 than the pipes 14 and 15.

The device 10 comprises a valve casing 23. Said valve casing comprises a cylindrical wall 24 from which extends a coaxial cylindrical wall 25 of reduced diameter, provided with an end wall 26. The cylindrical wall 24 has an inner bore 27, whereas a cylindrical wall 25 has an inner bore 28 coaxial with the bore 27. At its outer end, the cylindrical wall 24 is formed with a counterbore open end 29 formed with internal screw threads 30. It may also be formed with an external annular flange 31. The casing 23 is furthermore formed at the cylindrical wall 25 thereof with an upwardly extending internally threaded neck 33 formed with a through opening 34.

The pipe 14 may be connected to the neck 33 by any suitable union to permit passage of water upwardly to the shower. Said cylindrical wall 25 is furthermore formed with a downwardly extending internally threaded neck 35 which may be connected by any suitable union to the downwardly extending pipe 15 which leads to the bathtub faucet. Neck 35 is formed with a vertical through opening 37 coaxial with the vertical opening 34, the necks 33 and 35 each being in vertical alignment with the pipes 14 and 15.

Extending from the cylindrical portions 23 are a pair of outwardly extending horizontal internally threaded necks 39 and 40, formed with through openings 39a and 40a, respectively. The necks 39 and 40 may be connected to the hot and cold water pipes 21 and 20, respectively by suitable unions or fittings. The through openings 39a and 40a communicate with the bore 27, whereas the through openings 34 and 37 communicate with the bore 28.. The cylindrical wall 24 is formed with an internal annular groove 45 between the counterbore 29 and the inner bore 27. Received within the groove 45 is a rubber-like washer or gasket 46. Between the bores 27 and 28 is an annular shoulder 50 on which is mounted a rubber-like washer or gasket 51.

Screwed within the internally-threaded portion 30 of member 23 is a gland 55. Gland 55 comprises a cylindrical portion 56 having an externally threaded portion 57 screwed within the internally threaded opening 30 of member 23. Said member 55 is formed with an internal bore 58 of reduced diameter and with an internally screwed, threaded opening 59 adjacent thereto. Screwed within the threaded portion 59 is a sleeve 61. Also screwed in portion 59 is a second sleeve 61a. Said member 55 is also formed with an externally threaded outer end portion 62. Screwed thereto is a cap 63 formed with an end wall 63a having a circular opening 63b therein. The front end of member 55 projects through the open end of the chamber 13 forwardly of the wall surface 12. The chamber 13 may be closed by a front escutcheon 65 of usual construction, held against the front surface 12 by a collar 65a screwed to an externally threaded portion 64 of said cap.

Extending through the sleeve 61 is an axial stem 70. The stem 70 has a front round stem portion 71, the front end of which is formed with a transverse slot 72 forming ears 73 on opposite sides of the inside slot. The ears 73 are formed with aligned openings 74 receiving a transverse pin or shaft 75 (see Fig. 7). The stem 70 is formed with an intermediate portion 76 of polygonal cross-section. Beyond the polygonal portion 76, stem 70 is formed with a round portion 77. Extending from the round portion 77 is an annular wall 78 formed with an outer annular rearwardly extending ridge 80.

Extending rearwardly from wall 78 is a cylindrical sleeve or wall 111 slidable and rotatable in bore 28. A plug or end wall 112 closes the outer end of sleeve 111 and is fixed in place by soldering, braising or in any other suitable manner.

On the stem portion 71 is a washer 81. Between the washer 81 and the sleeve 61 is packing material 82. On said stem portion 71 is a second washer 83 disposed between the washer 81 and the polygonal portion 76. Between the washers 83, 81, and on the stem is a coil compression spring 84. On said stem is a rubber valve plug 85 contacting the rear face of the washer 83. The valve plug 85 has a frusto-conical surface for the purpose hereinafter appearing.

Rotatably mounted within the bore 27 is a rotary nonslidable valve sleeve member 90. Said member 90 comprises a cylindrical wall 91 rotatably received within said bore 27. Extending from the front end of the wall 91 is an annular front wall 92. Extending rearwardly from the wall 92 is an axial cylindrical wall 93 of reduced diameter. Disposed within said cylindrical wall 91, at the rear end of the cylindrical wall 93, is a transverse wall 94 formed with a polygonal opening 95 slidably receiving polygonal portion 76 of the valve stem 70. It will be noted that walls 93 and 94 form a socket which opens forwardly. At the junction of the wall 92 and 93 is a frusto-conical or tapering valve seat 96 adapted to be closed by the frusto-conical plug 85 on the valve stem 71. The spring 84 projects the valve plug 85 rearwardly to press it on to the seat 96. The valve stem 71 may slide through central openings in the washers 81, 83 and the plug 85. The front wall 92 is formed with an outwardly extending peripheral flange 92a received within the bore 29 and provided with a rearwardly extending annular ridge 92b adapted to press against the washer 46 on the shoulder 45.

The cylindrical wall 91 is formed with a pair of openings 100 and 101 which are spaced apart less than 180°. The angle between the outer sides of said openings is just about 180°. When the opening 100 is in registry with the hot water opening 39a (this may be accomplished by rotating member 90 in a clockwise direction from the position of Fig. 3) the cold water opening 40a is closed. When the opening 101 is in registry with the cold water 40a, the hot water opening 39a is closed. However, member 90 may be rotated so that both openings 100 and 101 partially overlap the openings 39a and 40a respectively. Such position is shown in Fig. 4 of the drawing.

It will be noted that rotation of the valve stem 70 will cause rotation of the valve cylinder 90. The valve cylinder 90 cannot be slidably moved, yet the valve stem can be slidably moved in a manner hereinafter appearing without sliding member 90. The degree of overlap of the openings 100 and 101 with the openings 39a, 40a may be regulated. When the opening 101 registers with the opening 40a and the opening 100 is closed, rotation of member 90 in a clockwise direction, looking at Fig. 4, will immediately begin to uncover the opening 100 and cause it to overlap the opening 39a, and at the same time, the opening 101 will begin to close. Thus, the valve may be caused to receive either hot water alone, or cold water alone, or a mixture of the two in varying proportions. As will be seen hereinafter, when the opening 100 overlaps hot water opening 39a and opening 101 overlaps cold water opening 40a, as in Fig. 4, water will pass to the shower. However member 90 may be rotated through an angle of 180° to overlap opening 100, 101 with openings 40a, 39a respectively to pass mixed hot and cold water to the bathtub faucet, as will be explained hereinafter.

Valve member 110 comprises sleeve 111 and walls 78 and 112 and is fixed to the valve stem 70 and slides and rotates therewith. The cylindrical wall 111 is formed adjacent the wall 78 with a plurality of spaced openings 114. It is also formed with a valve slot 115. The valve slot 115 has a width substantially equal to the diameters of both of the openings 34 and 37. The center of the slot 115 is angularly located midway between the openings 100 and 101, bisecting the longer angle (180°) between said openings.

In Fig. 6 there is illustrated cylindrical walls 91 and 111, developed coextensively, and the relative locations of the openings 100, 101, and 115 is shown.

It will now be understood that when opening 100 registers with the hot water opening 39a, and the valve stem is retracted in the manner hereafter appearing, one end of slot 115 will register with the shower opening 34. When the valve stem 70 is rotated, through an angle sufficient to bring the opening 101 into registry with the cold water opening 40a, with the valve stem retracted, the other end of the slot 115 will register with the shower opening 34. Thus, either hot or cold water may be directed to the shower opening. Of course, when the valve stem 70 is in the longitudinal position of Fig. 2, water entering the openings 100 and 101 cannot pass through the interior of valve member 110. However, when the valve stem 70 is slidably moved to the right, in a manner hereinafter to be explained, openings 114 will uncover and slot 115 will come more into alignment with the plane passing through the axis of the openings 34, 37 and water can then pass into the interior of member 110 and out through openings 34 and/or 37, depending upon the angular position of the valve stem. Both cold and hot water can be passed in mixed condition to the shower opening 34 by rotating the valve stem 70 to a position wherein both the openings 100 and 101 will partially overlap openings 39a and 40a, respectively, as shown in Fig. 4 of the drawing. At this time, the slot 115 would be at the top of sleeve 111.

When it is desired to pass water to the bathtub faucet, the stem is rotated in a manner hereinafter appearing, to bring the slot 115 to the bottom. In such position valve stem 70 may be rotated to either bring the opening 101 into registry with the opening 39a or the opening 100 into registry with the opening 40a or to partially overlap the openings 39a and 40a with the openings 101 and 100, respectively, depending upon the temperature of water desired.

The volume of water passing through to the shower or to the bathtub faucet, may be controlled by the degree of sliding movement of the valve stem 70 to the right, since as the valve stem is moved further to the right, slot 115 gradually begins to be cut off by the inner bore 28, as it passes beyond the openings 34 or 37.

It will be noted that as the valve stem 71 moves to the right, or left, the square or polygonal portion slides within the square or polygonal corresponding opening 95. As the stem moves, the spring 84 being between washers 81 and 83, under compression, retains the plug 85 on the seat 96.

The valve stem 70 may be rotated or slidably moved by means of a handle member 120. Said handle is provided with a flat upper portion 121 received within slot 72 and being formed with a slot 122 through which the transverse pin 75 passes. The flat portion 121 has an upward extension 124 received between the front wall 63a of the cap 63 and the sleeve 61a. The handle 120 may be grasped and rotated to rotate the valve stem 70 about its axis. However, the handle 120 may be pulled away from the wall 11 causing the projection 124 to contact the sleeve 61a and pull the stem 70 to the right.

Movement of the handle downwardly, or toward the wall, in any angular position of the stem 70, will cause the stem to slide to the left. Thus, the handle may be rotated about the axis of the pin 75 in any angular position of the valve stem 70. The single handle thus controls the mixing, distribution and volume of the water.

In Figs. 8 and 9 there is shown a modification.

In said figures there is shown a valve 10a similar to the valve 10 with the exception that member 110 is replaced by a member 140 having a cylindrical wall 140a formed with an end wall 141 which may be attached thereto in any suitable manner. The wall 140a is formed with openings 142 corresponding to the openings 114. The cylindrical wall 140 is formed with a pair of diametrically opposed, longitudinally offset slots 145 and 146. The control of hot and cold water for valve 10a is the same as for the valve 10. However, as the stem is moved to the right from the position shown in Fig. 8, slot 145 will first gradually move into registry with the bathtub faucet opening 37. Then, both of the openings 37 and 34 will be closed and as the valve stem continues moving to the right, slot 146 will register with the opening 34, so that water may pass upwardly to the shower. The volume of water passing through to the bathtub faucet or the shower is controlled by controlling the degree of overlap of the slots 145, 146 with the openings 37 and 34 respectively.

While sleeve 90 in Fig. 1 is shown to be formed with two openings 100 and 101 for controlling the inlet openings 39a, 40a, the slot 115 in sleeve 110 controls the outlet openings 34, 37. It will be understood that the sleeve 110 may be formed with the openings 100, 101 and sleeve 90 may be formed with the slot 115. In such event, the openings 34, 37 would become the inlet openings and the openings 39a, 40a would become the outlet openings. In such event, the openings 34, 37 would be horizontal and the openings 39a, 40a would be vertical.

It will thus be seen that there is provided an apparatus in which the several objects of this invention are achieved and which is well adapted to meet the condition of practical use.

As possible embodiments might be made of the above invention, and as various changes might be made in the embodiment above set forth, it is to be understood that all matter herein set forth or shown in the accompanying drawings is to be interpreted as illustrative and not in a limiting sense.

I claim:

1. A valve comprising a valve casing formed with a first bore and a second bore coaxial therewith and of greater diameter and communicating therewith, said valve casing being formed with a pair of diametrically opposed fluid outlet openings communicating with the first bore and being further formed with a pair of diametrically opposed inlet fluid openings communicating with the second bore and offset from the outlet openings and disposed at right angles thereto, a valve sleeve within the first bore, a valve stem extending axially from the valve sleeve, means to support said valve stem for rotary and sliding movement, said valve sleeve being formed with a slot, a second valve sleeve rotatably and non-slidably mounted within the second bore and having a sliding, non-rotary connection to the stem, said second sleeve being formed with a pair of openings spaced apart less than 180°, one of the valve openings in the second sleeve being adapted to register with one of the inlet openings while the other inlet opening is closed, and said openings in the second sleeve being adapted to overlap said inlet openings in varying proportions, said slot in the first sleeve having an angular extent substantially equal to the combined angular extent of the openings in the second valve sleeve, the center of said slot bisecting the angle between said pair of openings in said second sleeve, said first sleeve being formed with a plurality of openings adapted to be uncovered upon slidably moving said stem, and means including a single handle for both rotating and slidably moving said stem, said second sleeve being formed with a sealing seat surrounding said stem, a sealing plug on said stem, and spring means on said stem for pressing said plug against said sealing seat.

2. The combination of claim 1, and means including a single handle for rotating and slidably moving said valve stem.

3. The combination of claim 2, said casing being formed with a shoulder between said bores, a gasket on said shoulder, and a ridge on the first sleeve adapted to press against said gasket.

4. The combination of claim 3, a second gasket fixed within the second bore and forming a shoulder, and a ridge on the second sleeve, engaging the second gasket, said inlet openings being located between said second gasket and said first gasket.

References Cited in the file of this patent

UNITED STATES PATENTS

| | | |
|---|---|---|
| 960,558 | Koken | June 7, 1910 |
| 1,384,132 | Holm | July 12, 1921 |
| 1,693,758 | Hennessey | Dec. 4, 1928 |
| 2,448,675 | Loewe | Sept. 7, 1948 |
| 2,456,078 | Paille | Dec. 14, 1948 |
| 2,700,985 | Gleasman | Feb. 1, 1955 |